(12) United States Patent
Orakwue et al.

(10) Patent No.: US 9,904,612 B2
(45) Date of Patent: Feb. 27, 2018

(54) DYNAMIC VOLTAGE/FREQUENCY SCALING FOR MULTI-PROCESSORS USING END USER EXPERIENCE METRICS

(71) Applicant: Futurewei Technologies, Inc., Plano, TX (US)

(72) Inventors: Chukwuchebem Chinemelum Orakwue, San Diego, CA (US); Tongzeng Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/794,455

(22) Filed: Jul. 8, 2015

(65) Prior Publication Data
US 2017/0010946 A1     Jan. 12, 2017

(51) Int. Cl.
| G06F 11/34 | (2006.01) |
| G06F 1/24 | (2006.01) |
| G06F 11/30 | (2006.01) |
| G06F 9/445 | (2006.01) |
| G06F 1/20 | (2006.01) |
| G06F 1/32 | (2006.01) |
| H04W 52/02 | (2009.01) |
| H02M 3/156 | (2006.01) |

(52) U.S. Cl.
CPC ............ *G06F 11/3409* (2013.01); *G06F 1/24* (2013.01); *G06F 9/44505* (2013.01); *G06F 11/3024* (2013.01); *G06F 1/206* (2013.01); *G06F 1/3212* (2013.01); *H02M 3/156* (2013.01); *H04W 52/029* (2013.01); *Y02B 60/1292* (2013.01); *Y02B 60/142* (2013.01); *Y02B 60/144* (2013.01); *Y02B 60/50* (2013.01)

(58) Field of Classification Search
CPC ...... G06F 1/324; G06F 1/3203; G06F 1/3296; G06F 1/322; G06F 11/3409; G06F 11/3024; G06F 9/44505; G06F 1/24; G06F 1/3206; G06F 1/3212; G06F 1/206; G09G 2330/021; G09G 3/003; G09G 5/36; Y02B 60/1292; Y02B 60/142; Y02B 60/144; Y02B 60/50; H02M 3/156; H04W 52/029
See application file for complete search history.

(56) References Cited

U.S. PATENT DOCUMENTS

| 8,112,640 B2* | 2/2012 | Park ....................... G09G 3/003 345/501 |
| 2005/0223249 A1* | 10/2005 | Samson ................ G06F 1/3228 713/320 |
| 2009/0049314 A1 | 2/2009 | Taha et al. |
| 2010/0017636 A1* | 1/2010 | Hashimoto ........... G06F 1/3203 713/322 |
| 2011/0099404 A1 | 4/2011 | Hartmann et al. |
| 2014/0184619 A1 | 7/2014 | Kim |

(Continued)

*Primary Examiner* — Terrell Johnson
(74) *Attorney, Agent, or Firm* — Slater Matsil, LLP

(57) ABSTRACT

A system and method for dynamic voltage and frequency scaling for processors based on end-user experience metrics is disclosed. In an embodiment, a method in a data processing system for controlling a processor includes monitoring at least one end-user experience metric; obtaining at least one device policy, the device policy specifying a device constraint or measurable device condition; and adjusting at least one operating point for a processor according to at least one end-user experience metric and at least one device policy.

26 Claims, 5 Drawing Sheets

(56) References Cited

U.S. PATENT DOCUMENTS

2014/0215497 A1* 7/2014 Guo .................. H04W 52/0264
719/320
2014/0359324 A1* 12/2014 Park ........................ G09G 5/00
713/320

* cited by examiner

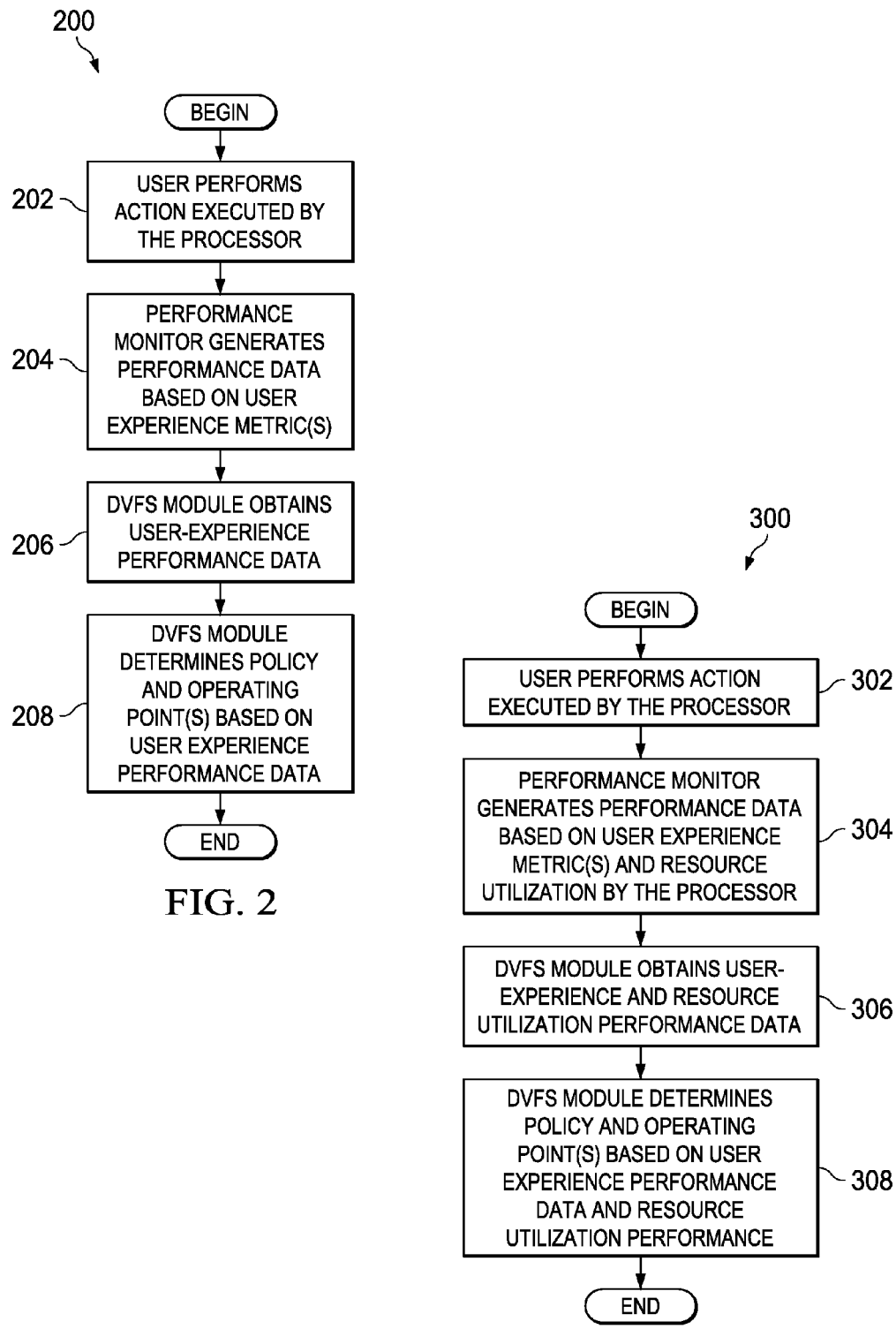

DYNAMIC VOLTAGE/FREQUENCY SCALING FOR MULTI-PROCESSORS USING END USER EXPERIENCE METRICS

TECHNICAL FIELD

The present invention relates generally to a system and method for controlling operation of a processor and, in particular embodiments, to a system and method for dynamic voltage and frequency scaling.

BACKGROUND

Mobile computing devices include System-On-Chip with one or multiple processors, such as a central processing unit (CPU) or a specialized coprocessor(s), e.g. a graphics processing unit (GPU), image signal processor (ISP), digital signal processor (DSP) etc. All of these processors must operate within a limited energy and thermal budget. To control performance and conserve energy, a Dynamic Voltage/Frequency Scaling (DVFS) method is employed for adjusting operating point(s) such as voltage, frequency of each processor, etc. so as not to waste energy. Selecting optimal operating points that still meet end user computing requirements still poses a challenge. Current DVFS methods include monitoring resource utilization metrics ("load") to determine optimal frequency and voltage for CPU. However, these load-based methods often compromise the user experience. Consequently, a system and method that ensures that the processor operates within prescribed limits with substantially minimal impact on the end user experience is desirable.

SUMMARY

In accordance with an embodiment, a method in a data processing system for controlling a processor includes monitoring at least one end-user experience metric; obtaining at least one device policy, the device policy specifying a device constraint or measurable device condition; and adjusting at least one operating point for a processor according to the at least one end-user experience metric and at least one device policy.

In accordance with another embodiment, a data processing system for controlling a processor to conform to device policies according to end-user experience includes a first processor and a non-transitory computer readable storage medium storing programming for execution by the first processor, the programming including instructions to: monitor at least one end-user experience metric; obtain at least one device policy, the device policy specifying a device constraint or measurable device condition; and adjust at least one operating point for a second processor according to the at least one end-user experience metric and the at least one device policy.

In accordance with another embodiment, a system for dynamic control of processor operating points according to policy constraints and end-user experience metrics includes a first processor; an end-user experience monitor to monitor at least one end-user experience metric, the end-user experience monitor comprising a second processor and non-transitory computer readable storage medium; and a controller to adjust at least one operating point of the first processor according to the at least one end-user experience metric and a device policy.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a flowchart of an embodiment of a method for adjusting processor operating points according to end-user experience metrics and device policies;

FIG. 3 is a flowchart of an embodiment of a method for adjusting processor operating points according to end-user experience metrics and device policies;

DETAILED DESCRIPTION OF ILLUSTRATIVE EMBODIMENTS

Figure 1:
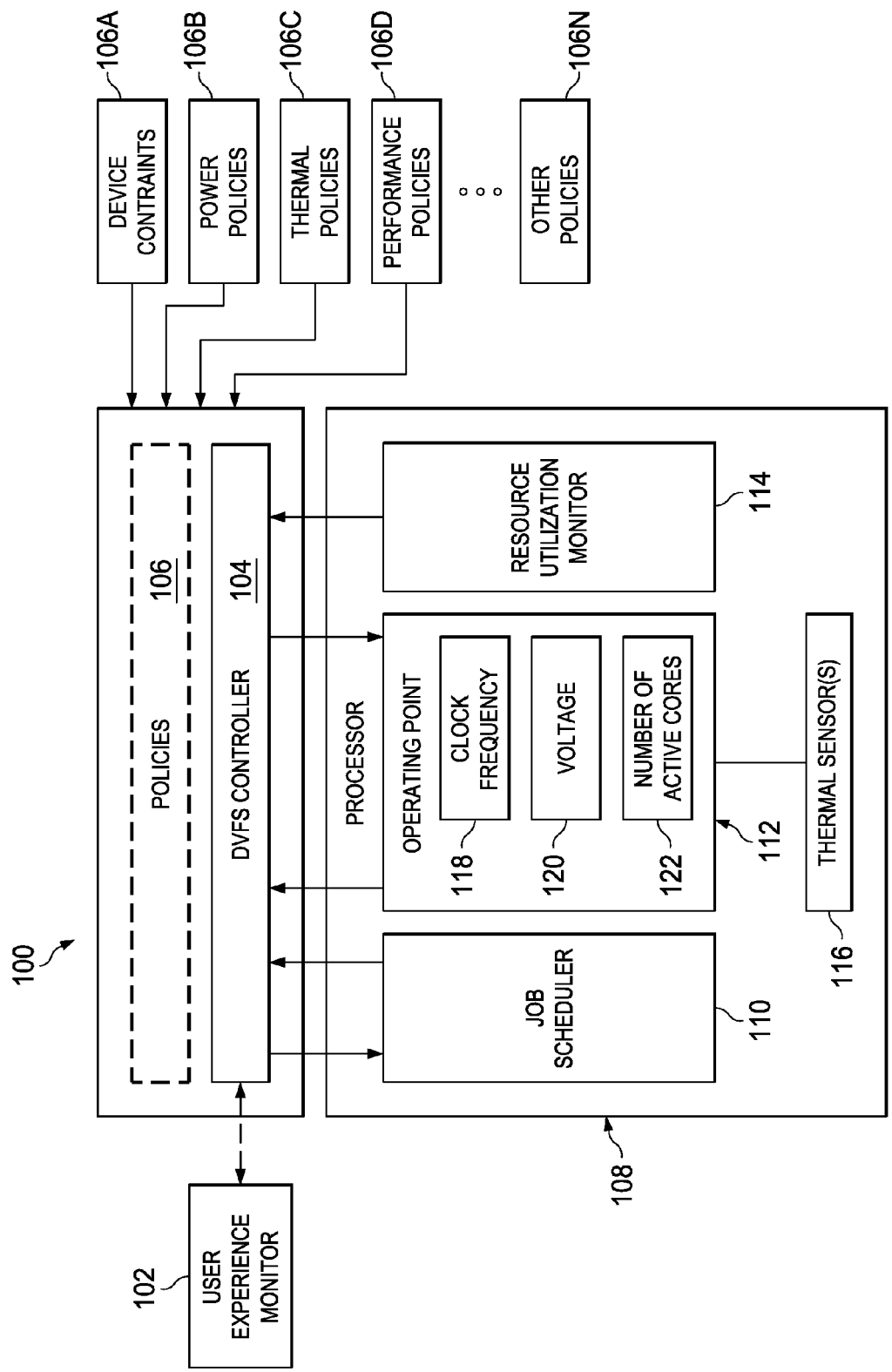
FIG. 1 is a block diagram of an embodiment of a system for controlling processor operating points according to user experience metrics.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are methods and systems to determine optimal operating point(s) using various metrics that quantify actual end-user experience rather than solely on "load"-based metrics. These end-user based metrics allow the processor to be operated within energy and thermal constraints while providing a user experience that is not degraded as much as those methods based on load metrics. Various embodiments of the disclosed systems and methods enable selection of optimal operating points for one or more processing units based on compute requirements as determined from one or more user-experience metrics and does not rely solely on "ad hoc" resource utilization based metrics to select operating points of the device since those metrics are not always a good quantifier of end-user experience.

Disclosed herein are methods and systems of DVFS using end-user experience metrics. Examples of end-user experience metrics include the number of frames per second, touch response latency, use-application launch latency, the number of audio/video glitches per second, disk read/write latency, network latency, etc. In various embodiments, the system includes an end-user experience monitoring system, a resource utilization monitoring system, a DVFS algorithm that determines policy and operating points based solely on end-user experience metric(s) or on a combination of end-user experience metric(s) and resource utilization metric(s). Examples of operating points include voltage, clock frequency, number of active processing or execution unit(s), etc. A load metric can also be estimated based on the complexity of the content being processed as measured by the software or by hardware using performance counters. Some examples of performance counters in the case of a CPU are instruction/data cache misses, Translation Lookaside Buffer misses, pipeline stalls, number of taken branches, the number of mis-predicted branches, the number of executed instructions, total number of processor cycles elapsed, and the number of stalled cycles.

Load-based methods of DVFS do not measure the user experience directly which leads to imprecise, coarse determinations of how to adjust the operating points that would minimally effect the user experience. Consequently, load-based methods of DVFS may result in a drastically inferior user experience when the operating points are adjusted merely to make the device conform to policies such as energy consumption, thermal properties, etc. In contrast, systems and methods according to the disclosure adjust the operating points based on user experience metrics that provide a much more precise and granular level of measuring the user experience which can take into account how the user is using the device at a particular moment in time. In such a circumstance, the appropriate operating points may be adjusted in such a manner such that it will cause the device to conform to policies while having a minimal impact (or as little impact as possible considering the policy) on the user experience. For example, there may be several combinations of adjustments to the CPU voltage and clock frequency that would reduce power consumption and reduce the heat generated by the device to conform to a policy. However, different combinations may have drastically different effects on the user experience. Existing prior art methods are incapable of adjusting the operating points in a manner to account for user experience as they only consider load parameters that are not necessarily directly related to the user experience. Consequently, the disclosed methods and systems provide a mechanism to keep the processor(s) of a device operating within policy parameters required for the device to function properly, conserve energy, etc., while maintaining a good user experience.

A user experience metric is any metric that directly quantifies/translates how a user "feels" or "perceives" the responsiveness and/or performance of an electronic device. A user experience metric excludes metrics that quantify the utilization of a resource or sub-component in an electronic device. These other metrics are referred to herein as "load-based" metrics. Load-based metrics include CPU utilization, idle and/or busy time, etc.

User experience metrics may fall into one of several application categories. Application categories include display, video, and graphics; input; audio; camera; web; and application software.

User experience metrics within the display, video, and graphics category include Frame Rate, dropped frames (a.k.a "Jank"), and display jitter (frame rate or Jank). Frame Rate is the number of frames processed per predefined interval. Dropped frames is the number of frames dropped per predefined interval. Display jitter is variance in separate Frame Rate and/or Jank measurements.

User experience metrics within the input category include response latency and response latency jitter. Response latency is the interval between when a user interacts with an input method (e.g., clicks a mouse button, presses a key, etc.) and when the device responds to the corresponding user interaction. In the case of interaction by touch, this is the interval from touching the touch-screen to the device displaying a frame in response to the user action. The response latency jitter is the variations in separate response latency measurements.

User experience metrics within the audio category include input latency, output latency, round-trip latency, and audio jitter (input, output, and round-trip latency). Input latency is the interval between when an external sound is presented to the device and when the application on the device reads the corresponding audio data. Output latency is the interval between when an application receives audio data and when the corresponding sound can be heard by an external listener or observed by a transducer device. Round-trip latency is the sum of input and output latency. Audio jitter is the variance or variances in separate input/output/round-trip latency measurements.

User experience metrics within the camera category include shutter lag, operating mode switch latency, and settings reconfigure latency. Shutter lag is the interval between when the user requests to capture an image and when the corresponding captured image is saved to the storage device. Operating mode switch latency is the interval between when the user requests to switch operating mode (e.g., from still-image to video or vice versa) to when the mode switch completes. Setting reconfigure latency is the interval between when a user requests to reconfigure the camera settings (e.g., focus, white balance, ISO, etc.) to when the camera device is reconfigured.

User experience metrics within the web category include page load time. Page load time is the interval between a user entering a web universal resource locator (URL) into a browser and when the browser displays the web page corresponding to the URL.

User experience metrics within the application software category include application response latency. The application response latency is the interval between when a user interacts with an application software via an input method and when the device responds to the corresponding user interaction. In the case of launching an application, the interval from requesting to start an application to the application being displayed and ready to accept user input is the application response latency.

The above listing of user experience metrics merely provides examples of user experience metrics. However, the user experience metrics are not limited to those described above. Those of ordinary skill in the art will recognize that other user experience metrics may be defined and utilized in the disclosed methods and systems.

FIG. 1 is a block diagram of an embodiment of a system 100 for controlling processor operating points according to user experience metrics. The system 100 includes a user experience monitor 102, a processor controller 104, and a processor 108. In an embodiment, the processor controller 104 is a DVFS controller that controls processor voltage and clock frequency. The processor 108 includes a job scheduler 110, operating points 112, a resource utilization monitor 114, and thermal sensors. The job scheduler 110, operating points 112, and the resource utilization monitor 114 may be implemented as hardware or as software. The operating point 112 includes clock frequency 118, voltage 120, and number of active cores 122. In an embodiment, the user experience monitor 102 may include a processor and non-transitory computer readable storage media. In other embodiments, the user experience monitor 102 may be included within and/or executed on processor 108. Processor 108 may include multiple execution units (a.k.a. cores).

The processor controller 104 adjusts various components within the processor 108 according to user experience metric(s) received from the user experience monitor 102 and according to the policies 106. The policies 106 include device constraints 106a, power policies 106b, thermal policies 106c, performance policies 106d, as well as other policies 106n. In some embodiments, the processor controller 104 also adjusts the various components within the processor 108 according to both the user experience metric (s) received from the user experience monitor 102 and according to load-based metrics received from the resource utilization monitor 114. The processor controller 104 may obtain measurements related to various policies 106 and to load-based metrics from various sensors and monitors within the processor 108, such as, for example, the resource utilization monitor 114 and the thermal sensor(s) 116.

In an embodiment, the processor controller 104 substantially optimally adjusts the components of the processor 108 such that the policies 106 are satisfied and the user experience is maintained at a high level as judged by the user experience metrics. The processor controller 104 may adjust the job scheduler 110, the clock frequency 118, the voltage 120, and the number of active cores 122. In an embodiment, the policies 106 are dynamically adjustable by the processor controller 104 based on various device and/or processor conditions and measurements. For example, the device runs on a battery and the battery is fully charged, the policies may be adjusted to reflect the conserving power is not a priority. In other embodiments, the policies 106 may include conditions specifying when a policy should be enforced. The policies 106 may also be adjustable according to various end-user experience metrics received from the user experience monitor 102.

FIG. 2 is a flowchart of an embodiment of a method 200 for adjusting processor operating points according to end-user experience metrics and device policies. The method 200 beings at block 202 where a user performs an action that is executed by the processor. At block 204, a performance monitor (e.g., user experience monitor 102 in FIG. 1) generates performance data based on user experience metrics. At block 206, a DVFS module (e.g., processor control 104 in FIG. 1) obtains the user-experience performance data. At block 208, the DVFS module determines policy and operating point(s) based on the user experience performance data, after which, the method 200 ends.

FIG. 3 is a flowchart of an embodiment of a method 300 for adjusting processor operating points according to end-user experience metrics and device policies. The method 300 begins at block 302 where a user performs an action that is executed by the processor. In some embodiments, block 302 is not included or may only be performed once. For example, for continuous video playback on a mobile device, the user need not perform an action in order for the system to generate performance data such as Frame Rate or Jank. In such scenarios, the action may only be performed once. At block 304, a performance monitor generates performance data based on user experience metric(s) and resource utilization by the processor. At block 306, a DVFS module obtains the user-experience and resource utilization performance data. At block 308, the DVFS module determines policy and operating point(s) based on the user experience performance data and the resource utilization performance, after which, the method 300 ends.

Figure 4:
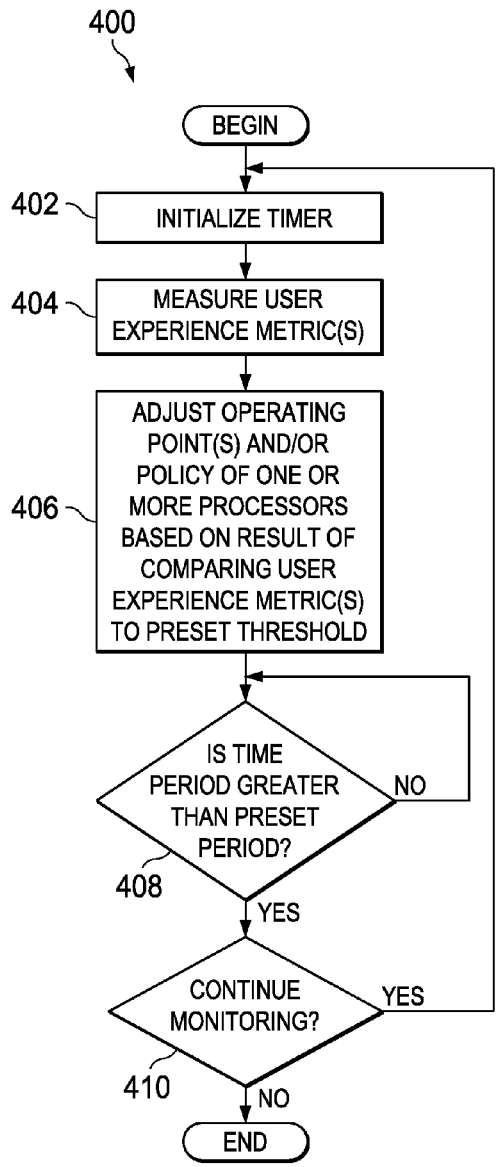
FIG. 4 is a flowchart of an embodiment of a method for monitoring user experience metrics using a timer based approach.

FIG. 4 is a flowchart of an embodiment of a method 400 for monitoring user experience metrics using a timer based approach. The method 400 begins at block 402 where a timer is initialized. At block 404, user experience metric(s) are measured by a monitor component. At block 406, the operating point(s) and/or policy of one or more processors are adjusted by the monitor component or a processor controller based on the results of comparing the user experience metric(s) to preset threshold(s). At block 408, the monitor component determines whether the time period on the timer is greater than a preset period. If no, then the monitor component continues to wait before measuring user experience metrics. If yes, then the method 400 proceeds to block 410. At block 410, the monitor component determines whether to continue monitoring and, if yes, the method 400 proceeds to block 402 and, if no, the method 400 ends.

Figure 5:
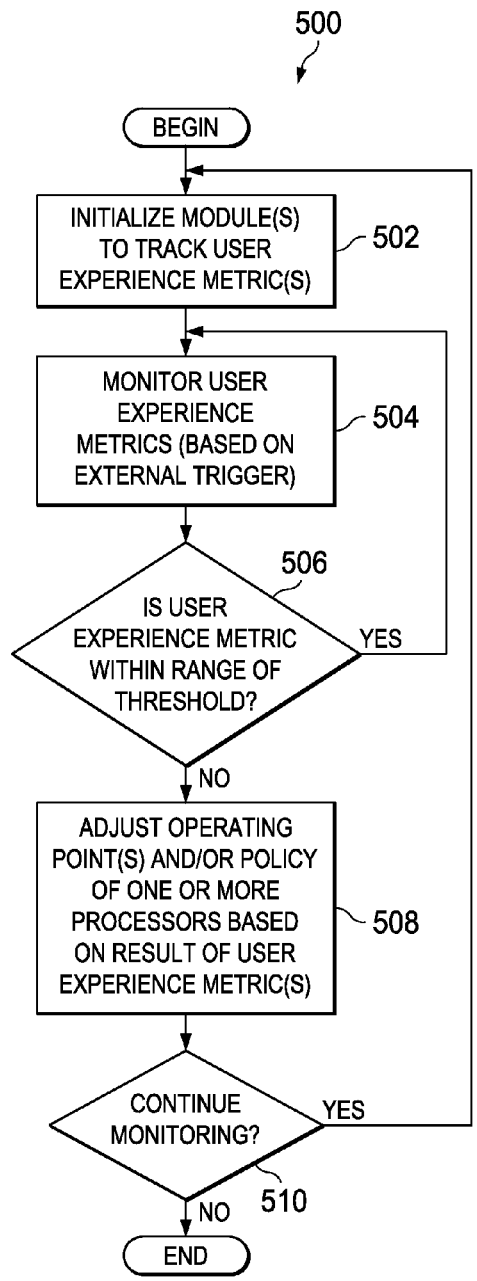
FIG. 5 is a flowchart of an embodiment of a method for monitoring user experience metrics using a trigger based approach.

FIG. 5 is a flowchart of an embodiment of a method 500 for monitoring user experience metrics using a trigger based approach. The method 500 begins at block 502 where the modules to track the user experience metric(s) are initialized. At block 504, the user experience metrics are monitored by a monitor component based on an external trigger. The external trigger could be user input, a change in output, a change in device conditions (e.g., battery life or processor temperature), or some other trigger. At block 506, the monitor component determines whether the user experience metric(s) are within range in the preset threshold(s). If, at block 506, the user experience metric(s) is within range in preset threshold(s), then the method 500 proceeds to block 504 where the monitor component continues to monitor the user experience metrics. If, at block 506, the user experience metric(s) is outside range of the preset threshold(s), then the method 500 proceeds to block 508 where the monitor component or a processor controller adjusts the operating point(s) and/or policy of one or more processors based on the result of the user experience metric(s). At block 510, the monitor component determines whether it should continue to monitor the user experience metric(s) and, if yes, the method 500 proceeds to block 504 and, if no, the method 500 may end.

Figure 6:
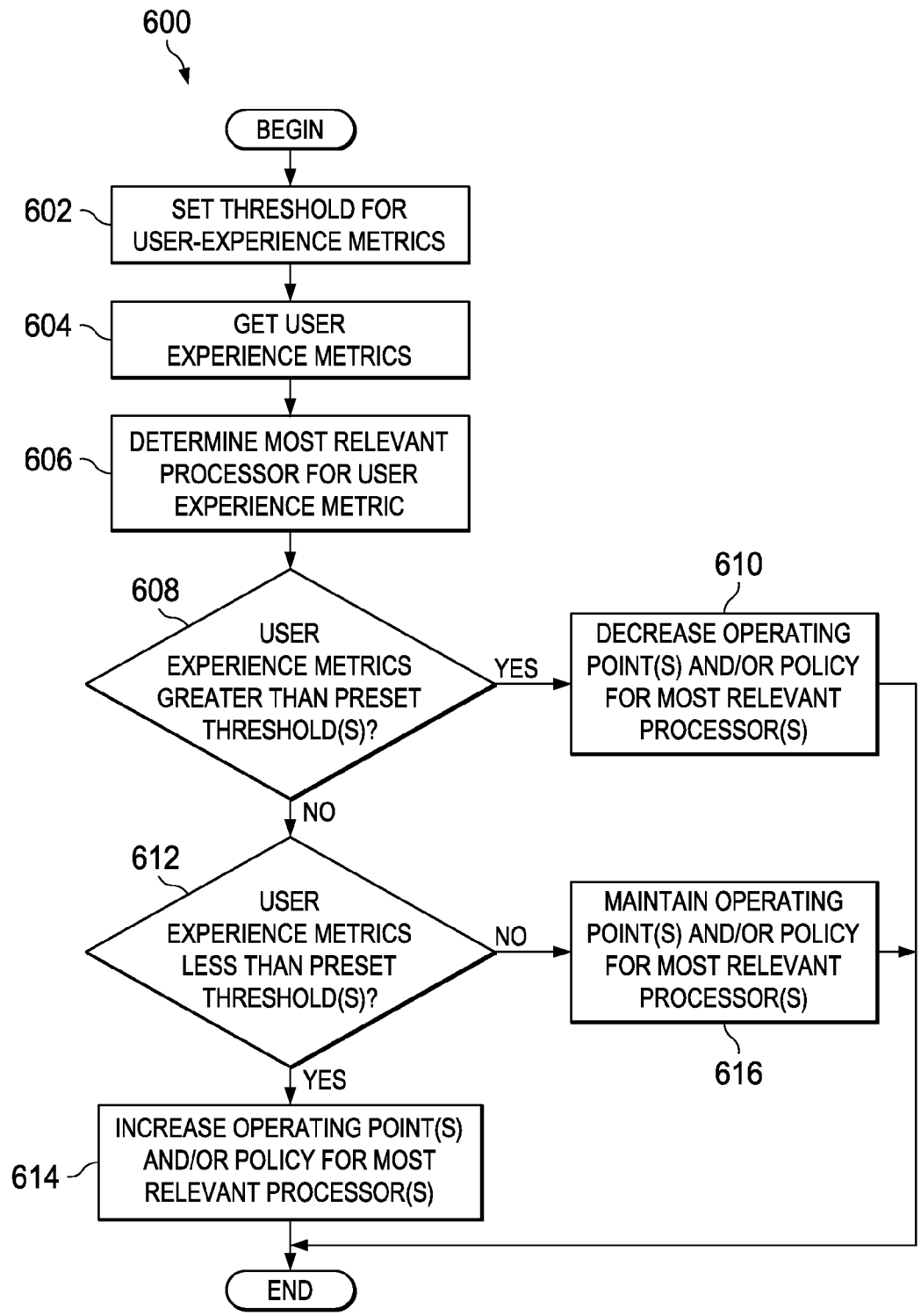
FIG. 6 is a flowchart of an embodiment of a method for adjusting operating points and/or processor policies according to end-user experience metrics.

FIG. 6 is a flowchart of an embodiment of a method 600 for adjusting operating points and/or processor policies according to end-user experience metrics. The method 600 begins at block 602 where a component sets a threshold for user-experience metric(s). At block 604, the component gets the user experience metric(s). At block 604, the component determines the most relevant processor to adjust for the user experience metric(s). At block 606, the component determines whether the user experience metric(s) is less than the preset thresholds. The preset threshold(s) may specify user experience metric(s) within which the device should operate to maintain an excellent user experience. If, at block 608, the component determines that the user experience metric(s) is greater than the present threshold(s), then the method 600 proceeds to block 610 where the component decreases the operating point(s) and/or policy for the most relevant processor(s), after which, the method 600 may end. If, at block 608, the user experience metric(s) is not greater than the preset threshold(s), the method 600 proceeds to block 612 where the component determines whether the user experience metric(s) is less than the preset threshold(s). If no, then the method 600 proceeds to block 616 where the component maintains the operating point(s) and/or policy for the most relevant processor(s), after which, the method 600 may end. If, at block 612, the user experience metric(s) is less than the preset threshold(s), then the method 600 proceeds to block 614 where the component increases the operating point(s) and/or policy for the most relevant processors, after which, the method 600 may end.

Figure 7:
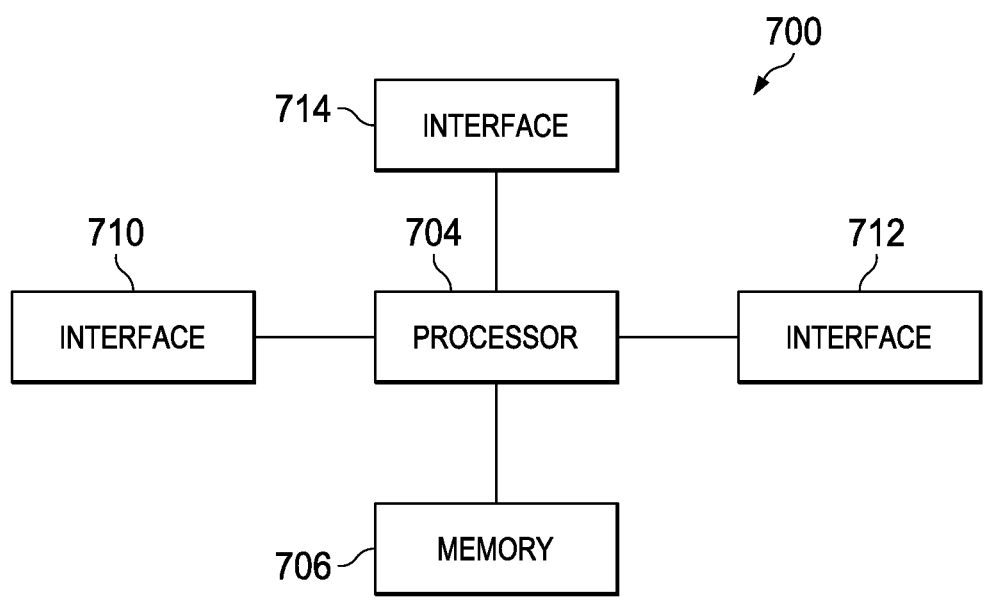
FIG. 7 illustrates a block diagram of an embodiment processing system 700 for performing methods described herein, which may be installed in a host device.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In one disclosed embodiment, a method in a data processing system for controlling a processor includes monitoring at least one end-user experience metric; obtaining at least one device policy, the device policy specifying a device constraint or measurable device condition; and adjusting at least one operating point for a processor according to the at least one end-user experience metric and the at least one device policy. The end-user experience metric may include one or more of frame rate, dropped frames, display jitter, response latency, response latency jitter, input latency, output latency, round-trip latency, audio jitter, shutter lag, operating mode switch latency, settings reconfigure latency, page load time, application response latency, and network latency. In an embodiment, the end-user experience metric is a value related to a measurement of an input or output related metric. In an embodiment, the method also includes adjusting at least one device operating point according to the end-user experience metric. The operating point includes at least one of processor voltage and clock frequency. The policy may include power policies and/or thermal policies. In an embodiment, the policy is dynamically determined according to the end-user experience metric(s), load condition(s), and/or measurement(s) of a device quality, such as a measurement of the remaining battery life and/or the processor temperature. In an embodiment, at least one of the device operating points and at least one device policies is adjusted when at least one end-user experience metric is outside a preset range. In an embodiment, the end-user experience metric is measured according to a timer. In an embodiment, the end-user experience metric is measured according to receipt of a trigger.

In another disclosed embodiment, a data processing system for controlling a processor to conform to device policies according to end-user experience includes a first processor and a non-transitory computer readable storage medium storing programming for execution by the first processor, the programming including instructions to: monitor at least one end-user experience metric; obtain at least one device policy, the device policy specifying a device constraint or measurable device condition; and adjust at least one operating point for a second processor according to the at least one end-user experience metric and at least one device policy. In an embodiment, the first processor is the second processor.

In another disclosed embodiment, a system for dynamic control of processor operating points according to policy constraints and end-user experience metrics includes a first processor; an end-user experience monitor to monitor at least one end-user experience metric, the end-user experience monitor comprising a second processor and non-transitory computer readable storage medium; and a controller to adjust at least one operating point of the first processor according to at least one end-user experience metric and a device policy.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a data processing system for controlling a processor, the method comprising:
   monitoring a plurality of end-user experience metrics, wherein the plurality of end-user experience metrics include all of a frame rate, dropped frames, display jitter, response latency, response latency jitter, input latency, output latency, round-trip latency, audio jitter, shutter lag, operating mode switch latency, settings reconfigure latency, page load time, application response latency, and network latency;
   obtaining at least one device policy and a plurality of end-user experience preset ranges, the at least one device policy specifying a device constraint or measurable device condition including thermal constraints of the processor, the plurality of end-user experience preset ranges specifying ranges within which the plurality of end-user experience metrics should be;
   selecting at least one operating point from a plurality of operating points for the processor for adjustment according to the plurality of end-user experience metrics, the plurality of end-user experience preset ranges, and the at least one device policy;
   adjusting the at least one device policy in response to the at least one device policy causing the plurality of end-user experience metrics to fall inside the plurality of end-user experience preset ranges; and
   adjusting the at least one operating point for the processor according to the plurality of end-user experience metrics, the plurality of end-user experience preset ranges, and the at least one device policy.

2. The method of claim 1, wherein the plurality of end-user experience metrics comprise values related to a measurement of an input or output related metric.

3. The method of claim 1, further comprising adjusting the at least one operating point according to the plurality of end-user experience metrics within constraints of the at least one device policy.

4. The method of claim 1, wherein the at least one operating point includes at least one of a processor voltage and a clock frequency.

5. The method of claim 1, wherein the at least one device policy includes power policies, performance policies, and thermal policies.

6. The method of claim 1, wherein the at least one device policy is dynamically determined according to at least one of the plurality of end-user experience metrics, a load condition, and a measurement of a device quality.

7. The method of claim 6, wherein the measurement of the device quality includes a measurement of remaining battery life and a processor temperature.

8. The method of claim 1, wherein the at least one operating point and the at least one device policy are adjusted when the plurality of end-user experience metrics are outside the plurality of end-user experience preset ranges.

9. The method of claim 1, wherein the plurality of end-user experience metrics are measured according to a timer.

10. The method of claim 1, wherein the plurality of end-user experience metrics are measured according to receipt of a trigger.

11. A data processing system for controlling a processor to conform to device policies according to end-user experience, comprising:
a non-transitory memory storage comprising instructions; and
one or more processors in communication with the memory, wherein the one or more processors execute the instructions to:
monitor a plurality of end-user experience metrics, wherein the plurality of end-user experience metrics include all of a frame rate, dropped frames, display jitter, response latency, response latency jitter, input latency, output latency, round-trip latency, audio jitter, shutter lag, operating mode switch latency, settings reconfigure latency, page load time, application response latency, and network latency;
obtain at least one device policy and a plurality of end-user experience preset ranges, the at least one device policy specifying a device constraint or measurable device condition including thermal constraints of a processor, the plurality of end-user experience preset ranges specifying ranges within which the plurality of end-user experience metrics should be;
select at least one operating point from a plurality of operating points for the processor for adjustment according to the plurality of end-user experience metrics, the plurality of end-user experience preset ranges, and the at least one device policy;
adjust the at least one device policy in response to the at least one device policy causing the plurality of end-user experience metrics to fall inside the plurality of end-user experience preset ranges; and
adjust the at least one operating point for the processor according to the plurality of end-user experience metrics, the plurality of end-user experience preset ranges, and the at least one device policy.

12. The data processing system of claim 11, wherein the plurality of end-user experience metrics comprise a value related to a measurement of an input or output related metric.

13. The data processing system of claim 11, wherein the at least one operating point includes at least one of a processor voltage and a clock frequency.

14. The data processing system of claim 11, wherein the at least one device policy includes power policies, performance policies, and thermal policies.

15. The data processing system of claim 11, wherein the at least one device policy is dynamically determined according to at least one of the plurality of end-user experience metrics, a load condition, and a measurement of a device quality.

16. The data processing system of claim 15, wherein the measurement of the device quality includes a measurement of remaining battery life and a processor temperature.

17. The data processing system of claim 11, wherein the at least one operating point and the at least one device policy are adjusted when the plurality of end-user experience metrics are outside the plurality of end-user experience preset ranges.

18. The data processing system of claim 11, wherein the plurality of end-user experience metrics are measured according to a timer.

19. The data processing system of claim 11, wherein the plurality of end-user experience metrics are measured according to receipt of a trigger.

20. A system for dynamic control of processor operating points according to policy constraints and end-user experience metrics, comprising:
a first processor;
an end-user experience monitor to monitor a plurality of end-user experience metrics, the end-user experience monitor comprising a second processor and non-transitory computer readable storage medium, wherein the plurality of end-user experience metrics include all of a frame rate, dropped frames, display jitter, response latency, response latency jitter, input latency, output latency, round-trip latency, audio jitter, shutter lag, operating mode switch latency, settings reconfigure latency, page load time, application response latency, and network latency; and
a controller to select at least one operating point from a plurality of operating points for the first processor for adjustment according to the plurality of end-user experience metrics, a plurality of end-user experience preset ranges, and at least one device policy, the at least one device policy specifying a device constraint or measurable device condition including thermal constraints of the first processor, the plurality of end-user experience preset ranges specifying ranges within which the plurality of end-user experience metrics should be, the controller further configured to adjust the at least one device policy in response to the at least one device policy causing the plurality of end-user experience metrics to fall inside the plurality of end-user experience preset ranges, the controller further configured to adjust the at least one operating point of the first processor according to the plurality of end-user experience metrics, the plurality of end-user experience preset ranges, and the at least one device policy.

21. The system of claim 20, wherein the plurality of end-user experience metrics comprise values related to a measurement of an input or output related metric.

22. The system of claim 20, wherein the at least one operating point includes at least one of a second processor voltage, a clock frequency, and a number of active execution units for the second processor.

23. The system of claim 20, wherein the at least one device policy includes power policies, performance policies, and thermal policies.

24. The system of claim 20, wherein the at least one device policy is dynamically determined according to at least one of the plurality of end-user experience metrics, a load condition, and a measurement of a device quality.

25. The system of claim 24, wherein the measurement of the device quality includes a measurement of remaining battery life and a second processor temperature.

26. The system of claim 20, wherein the first processor is the second processor.

* * * * *